(12) United States Patent
Nishimura et al.

(10) Patent No.: US 8,904,903 B2
(45) Date of Patent: Dec. 9, 2014

(54) SLIDING CABLE AND CONTROL CABLE

(75) Inventors: Atsuhiro Nishimura, Osaka (JP); Kenji Ose, Osaka (JP); Takamoto Asakawa, Osaka (JP); Shoichi Tsukada, Shiga (JP); Yoshiyuki Nagai, Osaka (JP); Koji Nishiya, Kyoto (JP)

(73) Assignees: Shimano Inc., Osaka (JP); Gunze Limited, Kyoto (JP)

( * ) Notice: Subject to any disclaimer, the term of this patent is extended or adjusted under 35 U.S.C. 154(b) by 13 days.

(21) Appl. No.: 13/571,329

(22) Filed: Aug. 9, 2012

(65) Prior Publication Data
US 2013/0087008 A1  Apr. 11, 2013

(30) Foreign Application Priority Data
Oct. 7, 2011  (JP) .................................. 2011-222626

(51) Int. Cl.
*F16C 1/20* (2006.01)

(52) U.S. Cl.
CPC ........................................ *F16C 1/20* (2013.01)
USPC ..................................................... 74/502.5

(58) Field of Classification Search
USPC .......... 74/500.5, 502.4, 502.5, 502.6; 57/230, 57/235
IPC .................................................. F16C 1/20,1/22
See application file for complete search history.

(56) References Cited

U.S. PATENT DOCUMENTS

| 746,319 | A | * | 12/1903 | Frees .............................. | 138/124 |
| 3,043,120 | A | * | 7/1962 | Waldron .......................... | 464/8 |
| 3,230,979 | A | * | 1/1966 | Tenreiro ........................ | 464/174 |
| 4,362,069 | A | * | 12/1982 | Giatras et al. ................ | 74/502.5 |
| 4,427,033 | A | * | 1/1984 | Ege ............................... | 138/103 |
| 5,195,393 | A | * | 3/1993 | Wolfington et al. ......... | 74/502.5 |
| 5,245,887 | A |   | 9/1993 | Tanaka et al. | |
| D391,198 | S | * | 2/1998 | Goffena ...................... | D12/127 |
| 5,799,544 | A | * | 9/1998 | Oda .............................. | 74/502.4 |
| 6,347,561 | B2 | * | 2/2002 | Uneme et al. ................ | 74/502.5 |
| 8,250,844 | B2 | * | 8/2012 | Markham ...................... | 57/213 |

FOREIGN PATENT DOCUMENTS

| JP | 60-35787 | Y2 |   | 10/1985 |
| JP | 62228708 | A | * | 10/1987 |
| JP | 02182574 | A | * | 7/1990 |
| JP | 10-159832 | A |   | 6/1998 |
| JP | 2000-130427 | A |   | 5/2000 |
| JP | 2001-140848 | A |   | 5/2001 |
| JP | 2004-19732 | A |   | 1/2004 |

OTHER PUBLICATIONS

Translation of JP 62228708 A obtained on Oct. 28, 2013.*
Translation of JP 02182574 A obtained on Oct. 28, 2013.*

* cited by examiner

*Primary Examiner* — Thomas R. Hannon
*Assistant Examiner* — Adam D Rogers
(74) *Attorney, Agent, or Firm* — Global IP Counselors

(57) ABSTRACT

A sliding cable is provided that basically includes a cable main body and a mesh structural body. The cable main body is made of a plurality of steel wires bundled together. The mesh structural body is arranged on an outer surface of the cable main body.

7 Claims, 4 Drawing Sheets

SLIDING CABLE AND CONTROL CABLE

CROSS-REFERENCE TO RELATED APPLICATIONS

This application claims priority under 35 U.S.C. §119 to Japanese Patent Application No. 2011-222626, filed Oct. 7, 2011. The entire disclosure of Japanese Patent Application No. 2011-222626 is hereby incorporated herein by reference.

BACKGROUND

1. Field of the Invention

This invention generally relates to a cable. More specifically, the present invention relates to a sliding cable that slides inside a casing and a control cable that comprises the sliding cable.

2. Background Information

Bicycles and other transportation devices use sliding cables to operate component parts. A sliding cable is a cable that moves inside a casing. A conventionally known sliding cable has a cable main body comprising steel wires bundled together and a protruding section formed on a surface of the cable main body (e.g., Japanese Laid-Open Patent Publication No. 2004-19732). The conventional sliding cable has a cable main body and an outer layer made of synthetic resin having a protrusion that is provided on an external circumference of the cable main body and extends straight in an axial direction. Providing an outer layer having a protrusion that extends in a sliding direction enables a sliding resistance to be reduced.

SUMMARY

The conventional sliding cable can reduce the sliding resistance. However, when grease or another lubricant is disposed in an interior of the cable main body, there is a possibility that the lubricant will migrate in an axial direction inside the outer layer. Consequently, the lubricant cannot be adequately held inside the sliding cable. If all of the lubricant escapes, then the sliding resistance may increase.

One aspect presented in this disclosure is to provide a sliding cable that can hold a lubricant adequately and reduce sliding friction.

A sliding cable according to the present disclosure basically comprises a cable main body and a mesh structural body. The cable main body is made of a plurality of steel wires bundled together. The mesh structural body is arranged on an outer surface of the cable main body.

In this sliding cable, the mesh structural body is arranged on the outer surface of the cable main body such that the cells of the mesh structural body form closed spaces on the surface of the cable main body. Thus, when a lubricant is applied to the sliding cable, the lubricant can be held adequately in the cells of the mesh structural Body. Also, since the cells of the mesh structural body form protrusions that protrude from the surface of the cable main body, the contact surface area with respect to a casing or other member that the cable main body and the mesh structural body slide against is reduced efficiently and the sliding friction is decreased.

In the illustrated embodiment, the mesh structural body is arranged on the outer surface of the cable main body such that the cells of the mesh structural body form closed spaces on the outer surface of the cable main body. Thus, when a lubricant is applied to the sliding cable, the lubricant can be held adequately in the cells of the mesh structural body.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided fOr illustration only and not for the purpose of limiting the invention as defined by the appended claims and their equivalents.

Figure 1:
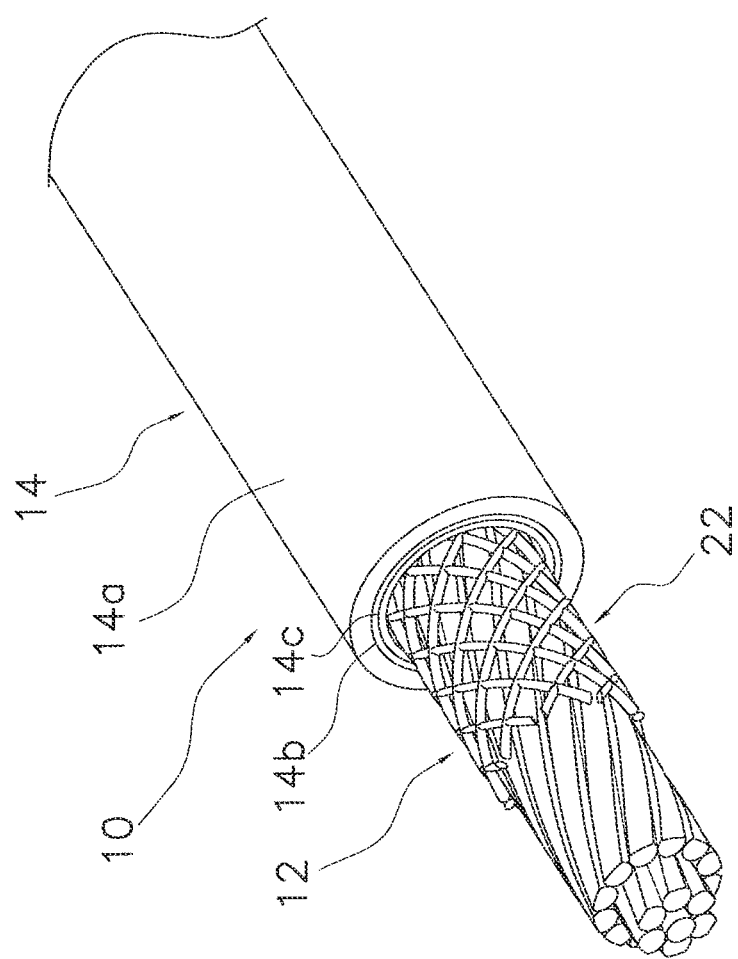
FIG. 1 is a perspective view of a control cable in accordance with one illustrative embodiment of the present invention.
Figure 2:
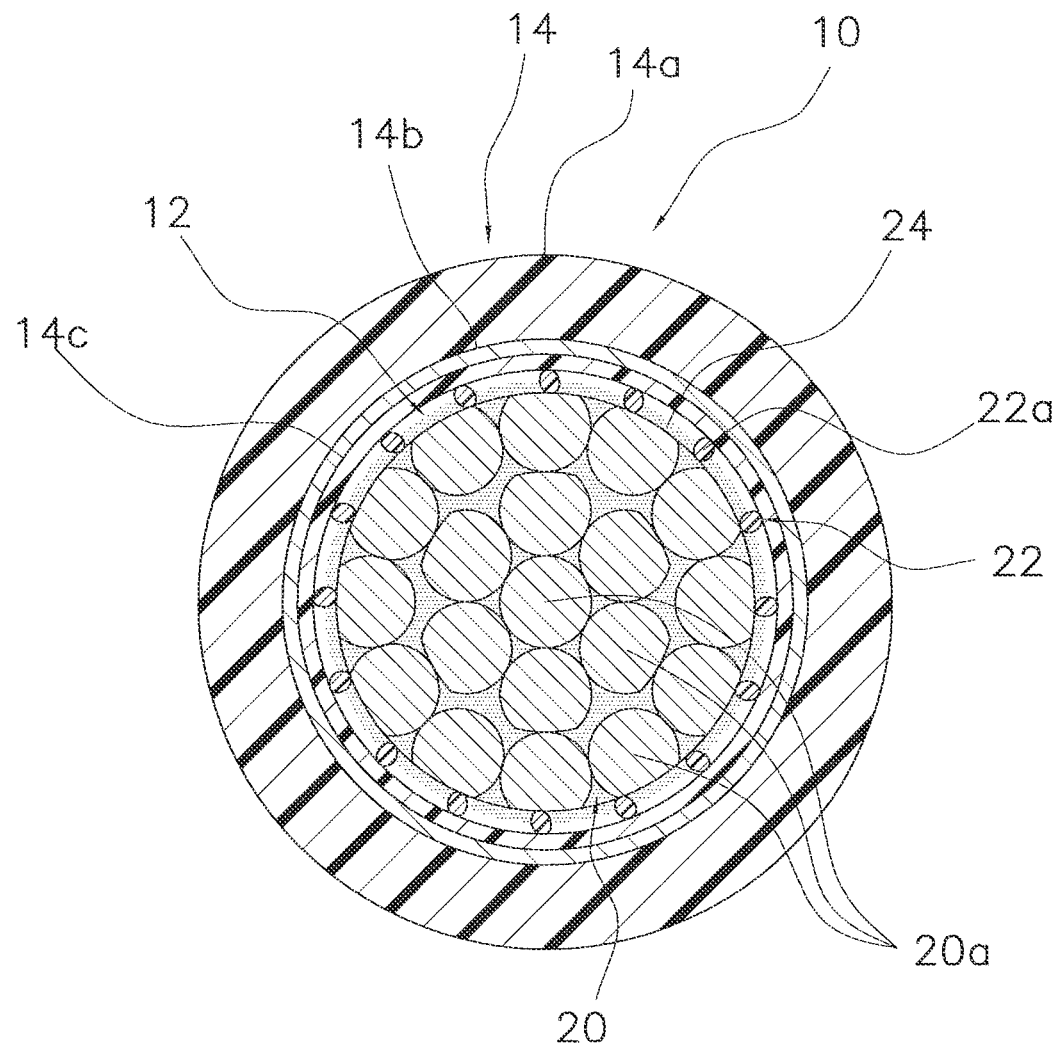
FIG. 2 is an enlarged transverse cross sectional view of the control cable illustrated in FIG. 1.

FIGS. 1 and 2 show a sliding cable according to one embodiment of the present invention. The sliding cable is used in a control cable 10 for controlling, for example, a braking device, a transmission, or a suspension of a bicycle. The control cable 10 has a sliding cable 12 and an outer casing 14. Thus, the control cable 10 is in the form of a Bowden-type cable.

Figure 3:
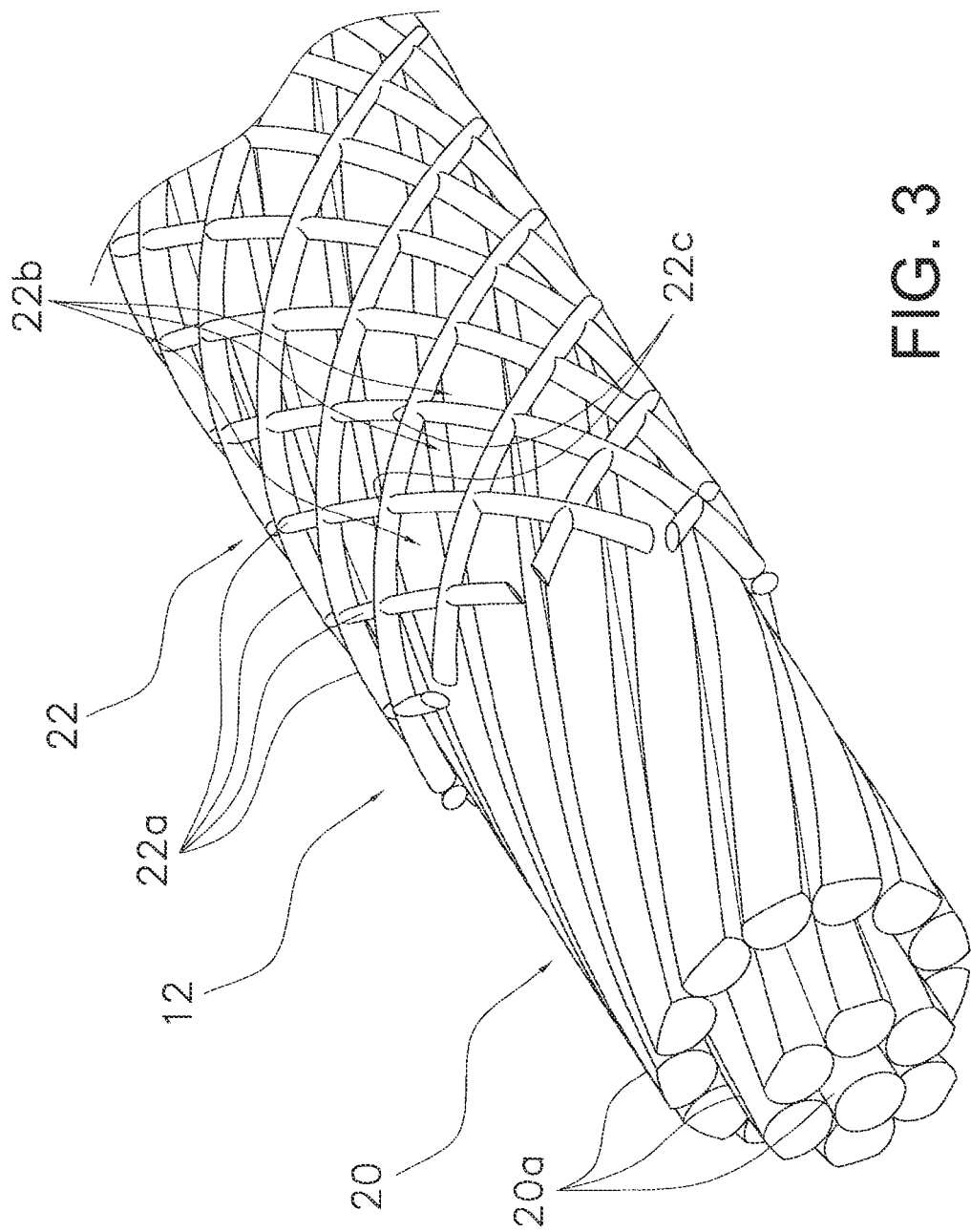
FIG. 3 is an enlarged perspective view of the sliding cable of the control cable in accordance with the illustrated embodiment.

As shown in FIGS. 2 and 3, the sliding cable 12 comprises a cable main body 20 and a mesh structural body 22. The cable main body 20 is made up of a plurality of steel wires 20a. The steel wires 20a are bundled together in a spiral fashion. The mesh structural body 22 is arranged on an outer surface of the cable main body 20. In this embodiment, the cable main body 20 comprises a total of nineteen steel wires 20a bundled together: one in the center, six on the outside of the center wire, and 12 in the outside of the six. The outer circumferences of the outermost steel wires 20a are machined with a die or other tool such that each of the outermost steel wires 20a has a circular arc shape forming a portion of a circle. A lubricant is applied to a periphery of the steel wires 20a of the cable main body 20 by spreading or spraying. The lubricant is, for example, a silicon based grease or an oil based grease.

The mesh structural body 22 comprises a plurality of strands 22a having a low friction coefficient. The mesh structural body 22 is thermally fused to the outside or outer surface of the cable main body 20. The mesh structural body 22 has a cylindrical shape and is arranged to cover the entire circumference of the cable main body 20. Each of the strands 22a forming the cells 22b of the mesh structural body 22 is arranged to intersect with a circumferential direction of the cable main body 20. Thus, the cells 22b have a diamond or a parallelogram shape. Consequently, the mesh structural body 22 is arranged between the cable main body 20 and the outer casing 14 such that the cells 22b are not perpendicular but diagonal with respect to the sliding direction. As a result, the sliding resistance is reduced and the sliding efficiency is improved.

Figure 4:
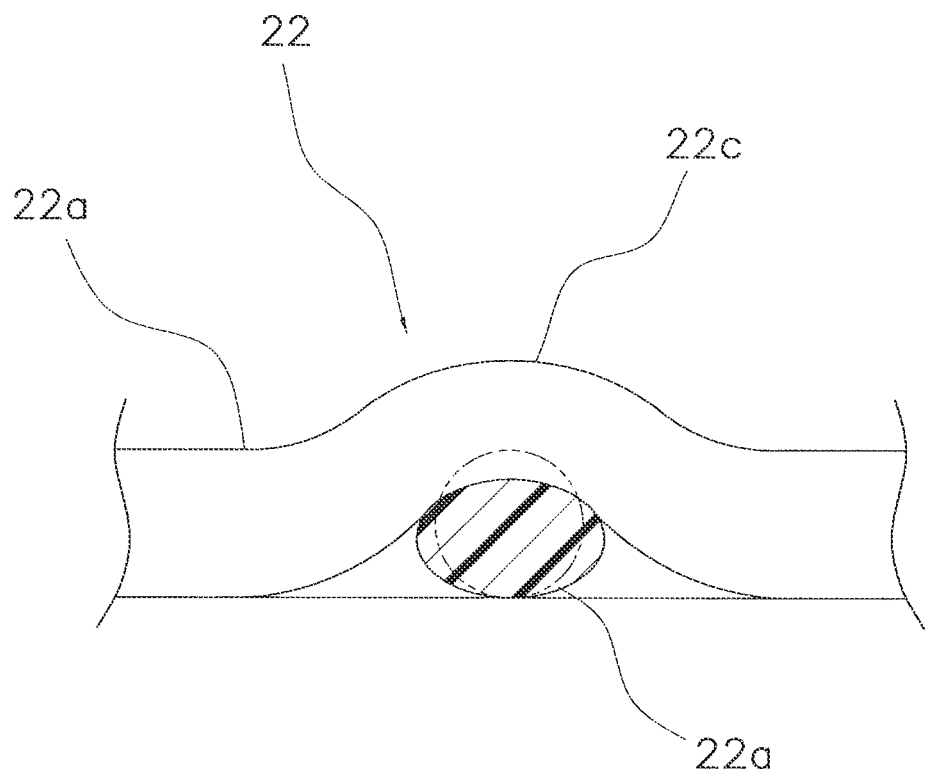
FIG. 4 is an enlarged partial cross sectional view adjacent an intersecting portion of a cell of the mesh structural body.

Although the intersecting portions of the cells 22b are not depicted accurately in FIGS. 2 and 3, the strands 22a overlap each other at each of the intersecting portions 22c of the cells 22b as shown in FIG. 4. The strands 22a are slightly squashed at the intersecting portions 22c. The intersecting portions 22c protrude outward in a radial direction because strands overlap each other. The protruding intersecting portions 22c become protrusions that contact the outer casing 14. Since the intersecting portions 22c are portions of the mesh structural body 22, the protrusions are arranged substantially evenly along the circumferential and axial directions on the outer circumferential surface of the cable main body 20. By arranging the strands 22a such that they overlap at the intersecting portions 22c of the cells 22b, the contact surface area between the strands 22a and the outer casing 14 can be further reduced and thereby the sliding resistance can be made smaller.

Also, since one strand 22a presses against the other strand 22a, the mesh structural body 22 can be prevented from easily peeling from the cable main body 20 even if a portion of the mesh structural body 22 is cut.

The mesh structural body 22 is made of a material selected from the group comprising polytetrafluoroethylene (PTFE), polyfluoroalkoxy fluororesin (PFA), and tetrafluoroethylene-hexafluoropropylene polymer (PEP). In this embodiment, the strands 22a are made of polytetrafluoroethylene (PTFE). Since a fluororesin that is hard and has a good sliding characteristic is used, the sliding resistance can be decreased efficiently.

The outer surface of the cable main body 20 is exposed through the cells of the mesh structural body 22. As shown in FIG. 2, it is acceptable for a lubricant 24 to be distributed among the steel wires 20a of the cable main body 20. In such a case, the lubricant 24 is disposed in the cells of the mesh structural body 22. Consequently, the lubricant 24 tends to be held on the cable main body 20 even if the sliding cable 12 moves inside the outer casing 14. Additionally, the lubricant 24 disposed in the cells of the mesh structural body 22 penetrates into spaces between the steel wires 20a such that it is possible to reduce the frictional resistance between steel strands 20a.

How the mesh structural body 22 is made will now be explained.

For example, the cable main body 20 includes a plurality strands 22a having a low friction coefficient are wound onto the cable main body 20 in a spiraling fashion such that they separated at an equal spacing and intersect one another. In particular, the strands 22a have a friction coefficient that is lower than a friction coefficient of the outer surface formed by the steel wires 20a of the cable main body 20. When this is done, there will be places where one strand lies over another. Then the cable main body 20 is heated such that the strands 22a are joined together at the intersecting portions 22c of the mesh structural body 22 and adheres to the steel wires 20a. Other acceptable adhesion methods include applying an adhesive to the steel wires 20a in advance such that the strands 22a adhere to the steel wires 20a and heating to a temperature higher than the melting point of the strands 22a to achieve adhesion.

As shown in FIGS. 1 and 2, the outer casing 14 houses the cable main body 20 and the adhered mesh structural body 22 such that the cable main body 20 and the mesh structural body 22 can side inside the outer casing 14. The outer casing 14 has an outer shell member 14a made of synthetic resin, a reinforcing member 14b comprising pliable steel wires woven into a cylindrical form, and a guide member 14c made of resin.

In such a sliding cable 12, the mesh structural body 22 is arranged on the outer surface of the cable main body such 20 that the cells 22b of the mesh structural body 22 form closed spaces on the outer surface of the cable main body 20. Thus, when a lubricant is applied to the sliding cable 12, the lubricant can be held adequately in the cells 22b of the mesh structural body 22.

Also, since the cells 22b of the mesh structural body 22 form protrusions that protrude from the outer surface of the cable main body 20, the contact surface area with respect to a casing or other member that the cable main body 20 and the mesh structural body 22 slide against is reduced efficiently and the sliding friction is decreased. Since the arrangement of the protrusions is related to the arrangement of the cells, protrusions are not concentrated in one portion of the outer surface of the cable main body but, instead, are evenly dispersed.

The intersecting portions 22c of the cells 22b are formed by one strand 22a overlapping another strand 22a and, thus, the overlapping portions 22c form protrusions that protrude more than other portions. Since the arrangement of the protrusions formed at the overlapping portions 22c of the cells 22b is related to the arrangement of the cells, protrusions are arranged so as not to be concentrated in one portion of the outer surface of the cable main body 20. As a result, the contact surface area with respect to the outer casing 14 is efficiently reduced and the sliding resistance is decreased.

Additionally, the lubricant 24 disposed in the cells 22b of the mesh structural body 22 is held by the strands 22a positioned around the cells 22b and does not readily become dispersed.

While only selected embodiments have been chosen to illustrate the present invention, it will be apparent to those skilled in the art from this disclosure that various changes and modifications can be made herein without departing from the scope of the invention as defined in the appended claims.

(a) In the previously explained embodiment, the present invention is explained based on an example in which the sliding cable is used in a control cable for a bicycle. However, the present invention is not limited to such an application. For example, the present invention can be applied to a sliding cable used in an automobile, a motorcycle, an aircraft, or some other transportation device. It can also be applied more generally to a sliding cable used in a machine.

(b) Although in the previously explained embodiment a fluororesin was presented as the material from which the mesh structural body is made, the present invention is not limited to such a material. For example, it is acceptable to use such synthetic resins as polyamide resins, polyacetal resins, and fiber reinforced resins that have a tow friction coefficient and excellent sliding performance.

(c) Although in the previously explained embodiment the strands 22a forming the cells 22b of the mesh-like structural member 22 are arranged diagonally with respect to the outer surface of the cable main body 20, the present invention is not limited to such an arrangement and the strands 22a constituting the mesh structural body can be arranged in any desired way.

(d) Although in the previously explained embodiment the strands are arranged such that one strand lies over another, the present invention is not limited to such an arrangement. It is acceptable to weld two strands together and arrange them such that they intersect.

Thus, the foregoing descriptions of the embodiments according to the present invention are provided for illustration only, and not for the purpose of limiting the invention as defined by the appended claims and their equivalents.

What is claimed is:

1. A sliding cable, which slides inside an outer casing, the sliding cable comprising:
    a cable main body made of a plurality of steel wires bundled together; and
    a mesh structural body arranged on an outer surface of the cable main body, the mesh structural body comprising a plurality of strands defining a plurality of cells by the strands intersecting, at least two of the strands of the mesh structural body being arranged such that a first strand of the at least two of the strands overlaps a second strand of the at least two of the strands at a portion of the first strand where the at least two of the strands intersect, the portion of the first strand being a protrusion in contact with an inner surface of the outer casing, a portion of the second strand where the at least two of the strands intersect being flattened by the first strand pressing on the portion of the second strand, the mesh structural body being thermally fused to the outer surface of the cable main body, and the mesh structural body being made of a material selected from a group consisting of polytetrafluoroethylene (PTFE), polyfluoroalkoxy fluororesin (PEA), tetrafluoroethylene-hexafluoropropylene polymer (PEP), polyacetal resin, and fiber reinforced resin.

2. The sliding cable as recited in claim 1, wherein the outer surface of the cable main body is exposed through the cells of the mesh structural body.

3. The sliding cable as recited in claim 2, wherein a lubricant is disposed on the steel wires of the cable main body.

4. The sliding cable as recited in claim 1, wherein the plurality of strands have a friction coefficient lower than a friction coefficient of an outer surface formed by the steel wires of the cable main body.

5. The sliding cable as recited in claim 1, wherein the mesh structural body has a cylindrical shape that extends around an entire outer circumference of the cable main body.

6. The sliding cable as recited in claim 1, wherein the mesh structural body is made of a material selected from the group consisting of polytetrafluoroethylene (PTFE), polyfluoroalkoxy fluororesin (PFA), and tetrafluoroethylene-hexafluoropropylene polymer (PEP).

7. A bicycle control cable including the sliding cable as recited in claim 1, the bicycle control cable comprising: the outer casing covering the sliding cable.

* * * * *